United States Patent [19]

Hurlock et al.

[11] Patent Number: 5,395,897
[45] Date of Patent: Mar. 7, 1995

[54] HIGH MOLECULAR WEIGHT SUBSTITUTED AMIDES FROM POLYCARBOXYLIC ACIDS

[75] Inventors: John R. Hurlock, Hickory Hills, Ill.; Martha R. Finck, St. Jerome, France

[73] Assignee: Nalco Chemical Company, Naperville, Ill.

[21] Appl. No.: 232,981

[22] Filed: Apr. 25, 1994

Related U.S. Application Data

[62] Division of Ser. No. 181,731, Jan. 18, 1994, abandoned.

[51] Int. Cl.$^6$ ................................................. C08F 8/34
[52] U.S. Cl. ................................ 525/344; 525/329.4; 525/329.9; 525/379; 525/380
[58] Field of Search ............ 525/379, 380, 344, 329.4, 525/329.9

[56] References Cited

U.S. PATENT DOCUMENTS

| Re. 28,474 | 12/1983 | Anderson et al. | |
| Re. 28,576 | 12/1983 | Anderson et al. | |
| 3,624,019 | 11/1971 | Anderson | |
| 4,150,945 | 4/1979 | Onizawa | 525/379 |
| 4,169,924 | 10/1979 | Barabas et al. | 525/379 |
| 4,587,306 | 5/1986 | Vio et al. | 525/380 |
| 4,675,359 | 6/1987 | Kadono et al. | 525/379 |
| 4,767,540 | 8/1988 | Spitzer et al. | |
| 4,868,248 | 9/1989 | Sparapany et al. | 525/380 |
| 4,902,751 | 2/1990 | Lewellyn et al. | |
| 5,270,369 | 12/1993 | Willcox et al. | 525/380 |

FOREIGN PATENT DOCUMENTS

| 0053106 | 5/1981 | Japan | 525/380 |
| 2185259 | 7/1987 | United Kingdom | 525/379 |
| 9109063 | 6/1991 | WIPO | 525/379 |

Primary Examiner—Joseph L. Schofer
Assistant Examiner—N. Sarofim
Attorney, Agent, or Firm—Robert A. Miller; James J. Drake

[57] ABSTRACT

The invention comprises a process for synthesizing a high molecular weight hydroxamic acid polymer and other substituted amides onto a polyacrylic acid or a polymethacrylic acid latex backbone by reacting a stable, inverse polyacrylic acid or polymethacrylic acid latex with hydroxylamine sulfate, in the case of hydroxamic acid, or other primary amines, to produce the high molecular weight substituted amides. The invention further comprises a method of clarifying Bayer process liquors using the substituted amides produced by the process.

4 Claims, 4 Drawing Sheets

HIGH MOLECULAR WEIGHT SUBSTITUTED AMIDES FROM POLYCARBOXYLIC ACIDS

This application is a division of application Ser. No. 08/181,731, filed Jan. 18, 1994, now abandoned.

BACKGROUND OF THE INVENTION

1. Field of the Invention

The invention relates to a process for synthesizing high molecular weight hydroxamic acids and other substituted amides on polyacrylic acid latex backbones. The invention further relates to a method of clarifying Bayer process liquors using the substituted amides produced by the process.

2. Description of the Prior Art

The preparation of hydroxamated polymers is well known in the art as disclosed in U.S. Pat. No. 4,902,751, the disclosure of which is incorporated herein by reference. However, when polymers produced by the '751 process have been utilized in Bayer process streams, it has been observed that polymers which contained a higher percentage of residual acrylamide functional groups were not as effective as those polymers in which the acrylamide had more fully hydrolyzed to acrylate.

An alternative method of synthesizing these polymers is disclosed in U.S. Pat. No. 4,868,248. The '248 patent discloses a method of synthesizing high molecular weight hydroxamic acid polymers on a polyacrylic acid backbone, thereby eliminating all acrylamide functional groups from the polymer chain. However, these polymers once again suffered from latex stability problems, especially with respect to the use of polyacrylic acid suspensions or emulsions as an initial building block.

Desirably, a method would exist which would allow the synthesis of stable high molecular weight hydroxamic acid polymers and other substituted amides which could be adopted for use as clarifying aids in Bayer process streams.

SUMMARY OF THE INVENTION

The invention comprises a process for synthesizing a high molecular weight hydroxamic acid polymer and other substituted amides onto a polyacrylic acid latex backbone by reacting a stable, inverse polyacrylic acid latex with hydroxylamine sulfate, in the case of hydroxamic acid, or other primary amines, to produce the high molecular weight substituted amides. The invention further comprises a method of clarifying Bayer process liquors using the substituted amides produced by the process.

DESCRIPTION OF THE PREFERRED EMBODIMENTS

The invention comprises a process for synthesizing a high molecular weight hydroxamic acid polymer. The method comprises reacting an aqueous solution, water soluble suspension, or emulsion of polyacrylic acid partially neutralized with sodium hydroxide with hydroxylamine to produce a stable, inverse polyacrylic acid latex. The solution, suspension or emulsion should contain at least 5% by weight of polyacrylic acid and should be reacted with hydroxylamine at a pH of between 3.5 to 6.0.

Once the partially neutralized polyacrylic acid latex is produced, hydroxylamine sulfate is added to the latex to produce a mixture. The mixture is then sparged with an inert gas in order to prevent oxidation. The inert gas is selected from the group consisting of nitrogen, helium, neon and argon.

Once the mixture is sparged it is heated to a temperature of between about 70° C. to about 120° C. to produce a high molecular weight hydroxamic acid polymer.

In order to reduce hydroxamic acid decomposition and prevent loss of polymer molecular weight during the reaction, a further step of adding an aqueous solution of sodium thiosulfate to the polyacrylic acid latex/hydroxylamine sulfate mixture prior to the step of sparging is preferred. Further, the molar ratio of polyacrylic acid latex to hydroxylamine sulfate in the mixture is preferably from 10:1 to 2:1. Most preferably the ratio is 10:3. Preferably, the synthesis is carried out for between 2 hours to 72 hours, and at a temperature between 70° C. and 120° C. More preferably, the time of synthesis should be between about 2 to 16 hours, and the temperature between 80° C. and 100° C.

The high molecular weight hydroxamic acid polymer produced by the above-described process has been found to be useful as an additive to Bayer process liquors for clarifying these liquors.

The synthesis method described above may be used to create any type of substituted amide utilizing a polyacrylic acid latex backbone. The process is identical to that described above. The stable inverse polyacrylic acid latex is made by neutralizing the acrylic acid monomer with sodium hydroxide prior to the polymerization or prior to the addition of a primary amine salt to the latex. Neutralization is preferably carried out by the addition of between about 0.15 to about 0.625 moles of sodium hydroxide per mole of the acrylic acid. Having neutralized the polyacrylic acid latex, a primary amine salt is added to the latex. The salt is selected from the group consisting of glycine, sulfanilic acid and ammonium formaldehyde bisulfite. Preferably, if a copolymeric substituted amide product is needed, the primary amine salt should be sulfanilic acid.

The following examples are presented to describe preferred embodiments and utilities of the invention and are not meant to limit the invention unless otherwise stated in the claims appended hereto.

EXAMPLE 1

Figure 1:
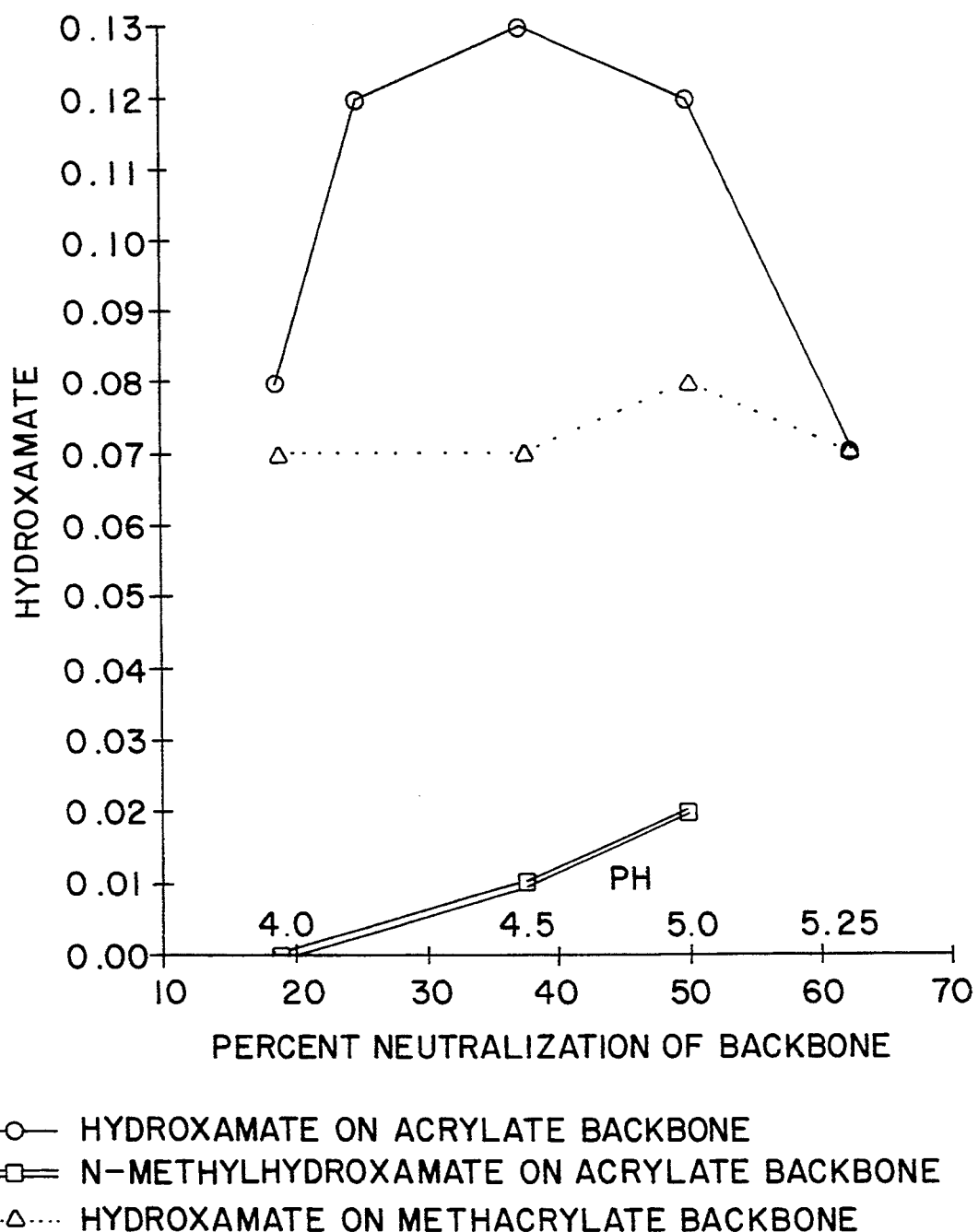
FIG. 1 is a graph comparing the percent neutralization of acrylic acid and methacrylic acid backbones after reaction with hydroxamine sulfate.

Four hydroxamic acid polymers on acrylic acid backbones were prepared by reacting hydroxylamine sulfate with a low pH inverse latex of polyacrylic acid. After a 21 hour reaction with 0.30 moles of hydroxylamine sulfate at 90° C., 7.0% to 13.0% of the polyacrylic acid was converted to hydroxamic acid polymer as shown in FIG. 1.

EXAMPLE 2

Three N-Methylhydroxamic acid polymers on acrylic acid backbones were prepared by reacting N-Methylhydroxylamine sulfate with a low pH inverse latex of polyacrylic acid. After a 21 hour reaction at 90° C., 1.0% to 2.0% of the polyacrylic acid was converted to N-Methylhydroxamic acid polymer as shown in FIG. 1.

EXAMPLE 3

Four hydroxamic acid polymers were made by reacting hydroxylamine sulfate with a low pH inverse latex of polymethacrylic acid. After a 21 hour reaction at 90° C., 7.0% to 8.0% of the polymethacrylic acid was converted to a hydroxamic acid polymer on a polymethacrylic acid backbone.

EXAMPLE 4

Substituted amides on polyacrylic backbones were prepared by reacting 0.3 moles of various types of primary amines, including glycine, aspartic acid, asparagine, glutamic acid, serine, sulfanilic acid, 3-hydroxytyramine sulfamic acid, ammonium formaldehyde bisulfite. Reaction temperatures were varied from 130° C. up to about 150° C. depending upon the reactivity of the amine species. The pH of the reaction was varied by adding amine as a salt to the backbone latex containing polyacrylic acid which had been neutralized with between 0.1875 and 0.50 moles of sodium hydroxide per mole of acrylic acid as shown in Table I below.

TABLE I
AMIDE DERIVATIVES OF SODIUM ACRYLATE OR METHACRYLATE BACKBONES

| Product Number | Amine Type | Backbone Composition | RSV BB | Backbone Na/COOH | Temp C. | Time Hrs. | Amine/ COOH | NaOH/ Amine | Acid/ Amine | Acrylate/ Acrylic Acid | pH | Acrylate Fraction | Amide Fraction | Percent Actives | RSV (BB) |
|---|---|---|---|---|---|---|---|---|---|---|---|---|---|---|---|
| 1 | Hydroxylamine | 100% Methacrylate | 7.1 | 0.333 | 90 | 18 | 0.3 | 0.1173 | 1 | 0.375 | 4.7 | 0.93 | 0.07 | 11.34 | 1.8 |
| 2 | Hydroxylamine | 100% Methacrylate | 7.1 | 0.333 | 90 | 18 | 0.3 | 0.267 | 1 | 0.5 | 5.2 | 0.92 | 0.08 | 11.12 | 2.71 |
| 3 | Hydroxylamine | 100% Methacrylate | 7.1 | 0.333 | 90 | 18 | 0.3 | 0 | 1.253 | 0.1875 | 4.0 | 0.95 | 0.05 | 11.23 | 2.3 |
| 4 | Hydroxylamine | 100% Methacrylate | 7.1 | 0.333 | 90 | 18 | 0.3 | 0.4754 | 1 | 0.625 | 5.5 | 0.93 | 0.07 | 11.04 | 2.14 |
| 5 | Nmethylhydroxylamine | 100% Acrylate | 30.5 | 0.375 | 90 | 18 | 0.3 | 0 | 1 | 0.375 | 3.7 | 0.99 | 0.01 | 17.34 | 3.7 |
| 6 | Nmethylhydroxylamine | 100% Acrylate | 32.4 | 0.5 | 90 | 18 | 0.3 | 0 | 1 | 0.5 | 4.5 | 0.98 | 0.02 | 17.28 | 2.6 |
| 7 | Nmethylhydroxylamine | 100% Acrylate | 35.3 | 0.1875 | 90 | 18 | 0.3 | 0 | 1 | 0.1875 | 3.5 | 1.00 | 0.00 | 17.4 | 5.7 |
| 8 | Glycine | 100% Acrylate | 30.8 | 0.5 | 150 | 8 | 0.3 | 0 | 0 | 0.5 | 5.2 | 0.79 | 0.21 | 15.22 | 36.3 |
| 9 | Glycine | 100% Acrylate | 35.3 | 0.1875 | 150 | 8 | 0.3 | 0 | 0 | 0.1875 | 4.5 | 0.83 | 0.17 | 15.19 | 13.7 |
| 10 | Glycine | 100% Acrylate | 30.5 | 0.375 | 150 | 8 | 0.3 | 0 | 0 | 0.375 | 5.0 | 0.8 | 0.2 | 15.21 | 30 |
| 11 | Glycine | 100% Acrylate | 37.8 | 0.5 | 150 | 8 | 0.3 | 0.4167 | 0 | 0.625 | 5.7 | 0.87 | 0.13 | 15.16 | 43 |
| 12 | Aspartic Acid | 100% Acrylate | 30.5 | 0.375 | 150 | 4 | 0.3 | 1 | 0 | 0.375 | 5.0 | — | slight | 9.23+ | 30.2 |
| 13 | Asparagine | 100% Acrylate | 30.5 | 0.375 | 150 | 4 | 0.3 | 0 | 0 | 0.375 | 5.2 | — | light | 9.46+ | 34.8 |
| 14 | Glutamic Acid | 100% Acrylate | 35.3 | 0.1875 | 150 | 8 | 0.3 | 1 | 0 | 0.1875 | 4.5 | 1 | 0 | 12.93 | 7.2 |
| 15 | Glutamic Acid | 100% Acrylate | 30.8 | 0.5 | 150 | 8 | 0.3 | 1.4167 | 0 | 0.5 | 5.2 | 1 | 0 | 12.93 | 31.1 |
| 16 | Glutamic Acid | 100% Acrylate | 37.8 | 0.5 | 150 | 4 | 0.3 | 0 | 0 | 0.625 | 5.7 | — | 0 | 13.94 | 33.2 |
| 17 | Serine | 100% Acrylate | 30.5 | 0.375 | 150 | 4 | 0.3 | 0 | 0 | 0.375 | 5.2 | — | slight | 10.08+ | 3 |
| 18 | Serine | 100% Acrylate | 35.3 | 0.1875 | 150 | 7 | 0.3 | 1.4167 | 0 | 0.1875 | 4.5 | 0.96 | 0.04 | 9.82 | 2.8 |
| 19 | Sulfanilic Acid | 100% Acrylate | 30.8 | 0.5 | 150 | 7 | 0.3 | 0 | 0 | 0.5 | 5.2 | 0.92 | 0.08 | 12.37 | 46.1 |
| 20 | Sulfanilic Acid | 100% Acrylate | 35.3 | 0.1875 | 150 | 7 | 0.3 | 1 | 0 | 0.1875 | 4.5 | 0.88 | 0.12 | 13 | 34.7 |
| 21 | Sulfanilic Acid | 100% Acrylate | 37.8 | 0.5 | 150 | 7 | 0.3 | 1.4167 | 0 | 0.625 | 5.7 | 0.95 | 0.05 | 11.9 | 45.7 |
| 22 | 3Hydroxytyramine | 100% Acrylate | 35.3 | 0.1875 | 150 | 7 | 0.3 | 0 | 0 | 0.1875 | 3.5 | 0.87 | 0.13 | 14.01 | 2.5 |
| 23 | 3Hydroxytyramine | 100% Acrylate | 30.8 | 0.5 | 150 | 7 | 0.3 | 1 | 0 | 0.5 | 5.0 | 0.81 | 0.19 | 14.84 | 1.3 |
| 24 | NH4HSO3 + CH2O | 100% Acrylate | 22 | 0.5 | 150 | 7 | 0.3 | 0 | 0 | 0.5 | 4.7 | 0.81 | 0.19 | 13.41 | 10.3 |
| 25 | NH4HSO3 + CH2O | 100% Acrylate | 30.9 | 0.375 | 150 | 7 | 0.3 | 1 | 0 | 0.675 | 5.5 | 0.86 | 0.14 | 16.23 | 9.9 |
| 26 | NH4HSO3 + CH2O | 100% Acrylate | 28.4 | 0.3 | 150 | 7 | 0.3 | 0 | 0 | 0.3 | 4.5 | 0.82 | 0.18 | 17.25 | 7.5 |
| 27 | Sulfamic Acid | 100% Acrylate | 37.8 | 0.5 | 150 | 7 | 0.3 | 1 | 0 | 0.5 | 5.5 | 1 | 0 | 16.94 | 27.9 |
| 28 | Sulfamic Acid | 100% Acrylate | 34.2 | 0.1875 | 150 | 7 | 0.3 | 0.992 | 0 | 0.185 | 4.5 | 0.98 | 0.02 | 17.06 | 23.3 |

Figure 2:
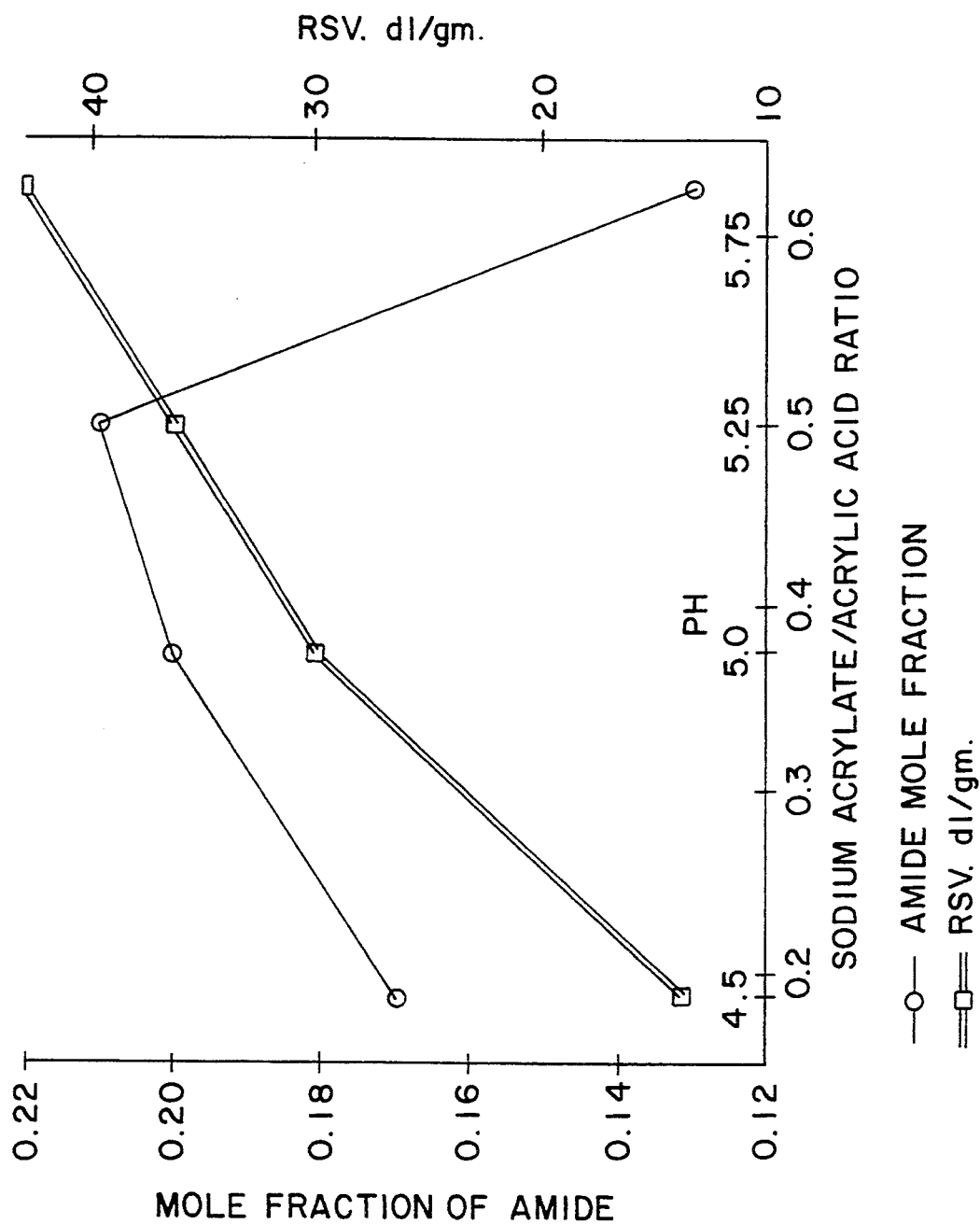
FIG. 2 is a graph showing a comparison between the yield and reduced specific viscosity of glycine amide on a polyacrylic acid backbone after reaction with polyacrylic acid.

As a result of the above reactions, the following products were yielded. The reaction of the amino acid glycine with polyacrylic acid produced the highest yield of the amide at a pH of 5.25, i.e., 50% neutralized polyacrylic acid, after an 8 hour reaction at 150° C. as shown in FIG. 2. Maximum reduced specific viscosity (RSV) of the resulting substituted amide polymer was obtained when the reaction was conducted at a pH of 5.75, i.e., 62.5% neutralized polyacrylic acid, as shown in FIG. 2.

Figure 3:
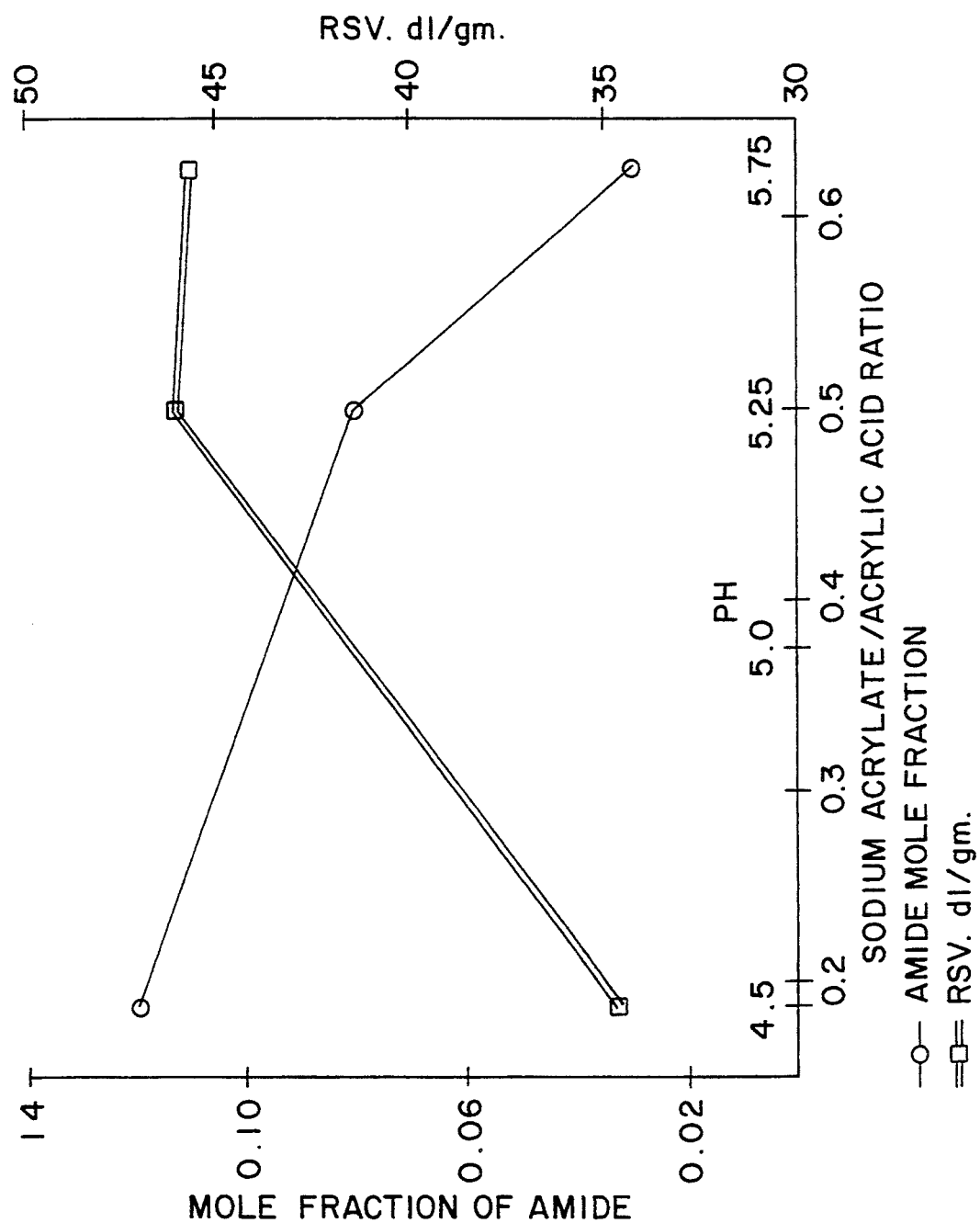
FIG. 3 is a graph showing a comparison between the yield and reduced specific viscosity of sulfanilic amide after reaction of polyacrylic acid.

The reaction of a sodium salt of sulfanilic acid with polyacrylic acid produced the highest yield of sulfanilic amide and a pH of about 4.5, i.e., 18.75% neutralized polyacrylic acid, after a 7 hour reaction at 150° C. as shown in FIG. 3. Maximum RSV of the resulting sulfanilic amide copolymer was obtained when the reaction was conducted at a pH of between 5.25 to 5.75 as shown in FIG. 3.

Figure 4:
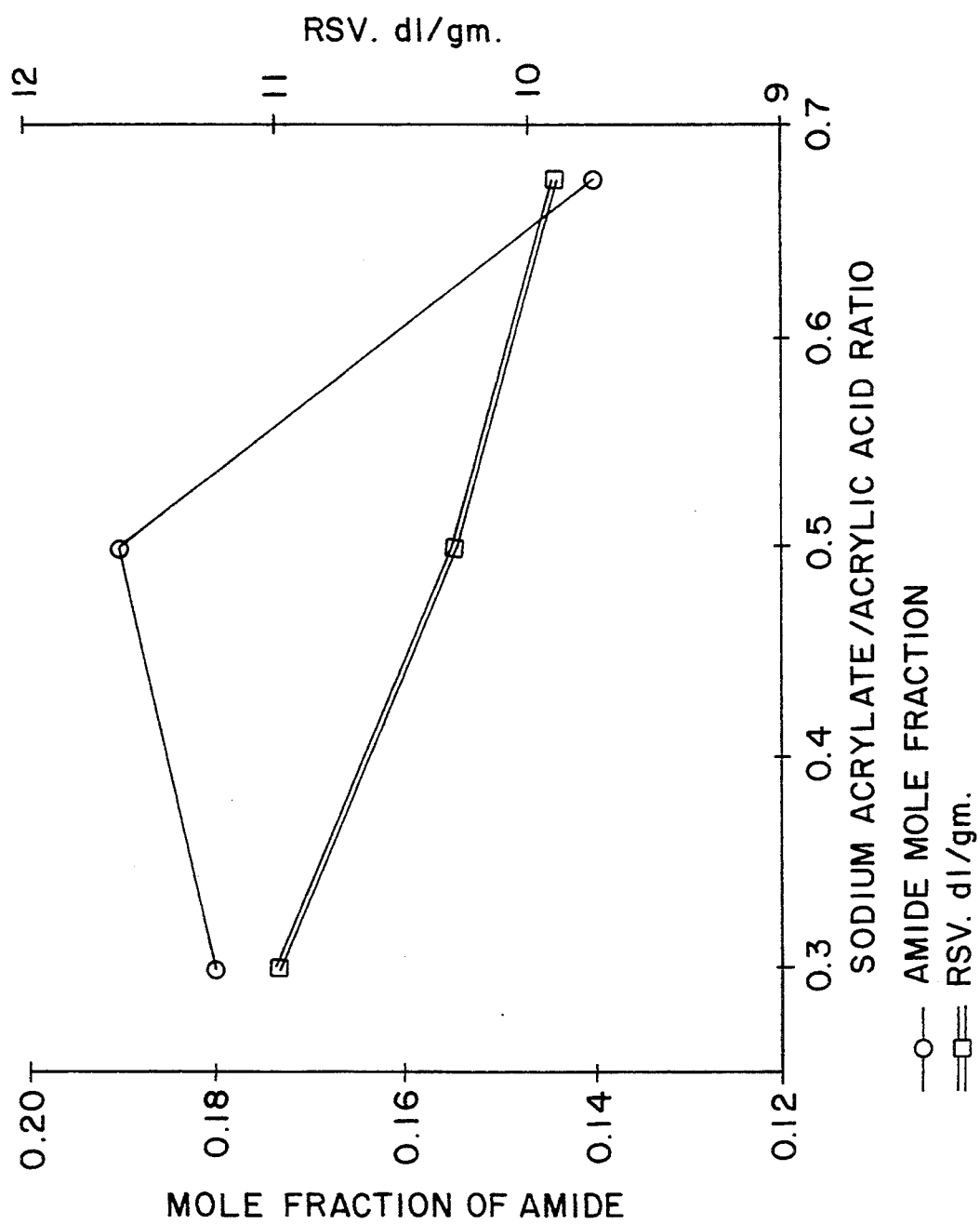
FIG. 4 is a graph showing a comparison between the yield and reduced specific viscosity of sulfomethyl amide after reaction of sulfomethyl amide.

A reaction was carried out between ammonium formaldehyde bisulfite with polyacrylic acid producing the highest yield of sulfomethylated acrylic amide when the backbone was 50% neutralized after a 7 hour reaction at 150° C. as shown in FIG. 4. Maximum RSV of the resulting sulfanilic acrylic amide was obtained when the backbone was 18.75% neutralized as shown in FIG. 4.

EXAMPLE 5

Substituted amides on copolymers of acrylic acid and acrylamide were prepared by reacting 0.15 to 0.30 moles of sulfanilic acid with 1.0 mole of a low pH inverse latex of a copolymer of acrylamide containing 0.15 or 0.30 moles of acrylic acid. After a reaction of 7 hours at 150° C., approximately 30% of the sulfanilic acid had reacted to form the sulfanilic amide of polyacrylic acid. When the reaction was repeated on a backbone of acrylamide homopolymer buffered at low pH with sodium hydrogen phosphate, only 0.02 moles of the sulfanilic amide were formed. These results are explained by the probability that the sulfanilic acid reacted with a portion of the 0.27 moles of acrylic acid which formed by way of the hydrolysis of the polyacrylamide rather than with the polyacrylamide directly.

Changes can be made in the composition, operation and arrangement of the method of the present invention described herein without departing from the concept and scope of the invention as defined in the following claims:

We claim:

1. A process for synthesizing a copolymeric substituted amide comprising:
   reacting an aqueous solution, water-soluble suspension or emulsion polyacrylic acid, which solution, suspension or emulsion contains at least 5% by weight of polyacrylic acid with hydroxylamine at a pH of between 3.5 to 6.0, to produce a stable, inverse polyacrylic acid latex;
   neutralizing the polyacrylic acid latex or acrylic acid monomer with sodium hydroxide:
   adding a primary amine salt to the polyacrylic acid latex to produce a mixture;
   sparging the mixture with nitrogen;
   heating the sparged mixture to a temperature of between about 130° C. to 150° C. to produce a copolymeric substituted amide.

2. The process of claim 1, wherein the amount of sodium hydroxide added to the acid monomer or the polyacrylic acid latex is between about 0.15 to about 0.625 moles per mole of acrylic acid.

3. The process of claim 1, wherein the primary amine comprises a salt selected from the group consisting of glycine, sulfanilic acid and ammonium formaldehyde bisulfite.

4. A process for synthesizing a copolymeric substituted amide comprising:
   reacting an aqueous solution, water-soluble suspension or emulsion of polyacrylic acid, which solution, suspension or emulsion contains at least 5% by weight of polyacrylic acid with hydroxylamine at a pH of between 3.5 to 6.0, to produce a copolymer of acrylic acid and acrylamide;
   neutralizing the acrylic acid monomer or the polyacrylic acid latex with sodium hydroxide;
   adding a sulfanilic acid to the polyacrylic acid latex to produce a mixture;
   sparging the mixture with nitrogen;
   heating the sparged mixture to a temperature of between about 130° C. to 150° C. to produce a copolymeric substituted amide.

* * * * *